US011167808B2

(12) United States Patent
Renke et al.

(10) Patent No.: US 11,167,808 B2
(45) Date of Patent: Nov. 9, 2021

(54) TELESCOPING RETENTION PIN

(71) Applicant: GM GLOBAL TECHNOLOGY OPERATIONS LLC, Detroit, MI (US)

(72) Inventors: David T. Renke, Macomb, MI (US); Michael D. Richardson, Troy, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 962 days.

(21) Appl. No.: 15/878,462

(22) Filed: Jan. 24, 2018

(65) Prior Publication Data

US 2019/0225281 A1    Jul. 25, 2019

(51) Int. Cl.
*B62D 27/06* (2006.01)
*F16B 7/04* (2006.01)
*F16B 21/08* (2006.01)
*F16B 5/12* (2006.01)
*F16B 5/06* (2006.01)

(52) U.S. Cl.
CPC ............ *B62D 27/06* (2013.01); *F16B 5/0628* (2013.01); *F16B 5/123* (2013.01); *F16B 7/042* (2013.01); *F16B 21/086* (2013.01)

(58) Field of Classification Search
CPC ...... F16B 7/0406; F16B 7/0413; F16B 7/042; F16B 7/10; F16B 7/105; F16B 21/082; F16B 21/084; F16B 21/086
See application file for complete search history.

(56) References Cited

U.S. PATENT DOCUMENTS

| | | | | |
|---|---|---|---|---|
| 3,056,177 A | * | 10/1962 | Ruhala | B60S 1/48 239/284.1 |
| 4,577,837 A | * | 3/1986 | Berg | A47G 27/0493 248/408 |
| 5,201,334 A | * | 4/1993 | Tseng | A61H 3/0244 135/68 |
| 9,127,699 B2 | * | 9/2015 | Lambertson, Jr. | F16B 7/042 |
| 9,254,908 B2 | * | 2/2016 | Healy | H02G 3/32 |
| 9,503,015 B2 | * | 11/2016 | Cantolino | H02S 20/20 |
| 9,717,948 B1 | * | 8/2017 | Hsu | F16B 7/00 |

(Continued)

FOREIGN PATENT DOCUMENTS

CN     204436991 U     7/2015
JP     2000240624 A    9/2000

(Continued)

*Primary Examiner* — Jonathan P Masinick
(74) *Attorney, Agent, or Firm* — Quinn IP Law

(57) ABSTRACT

An alignment device includes a first body and a second body, at least one retention member flexibly coupled to the first body, and a locking member coupled to the first body. The second body has an outer surface and an inner surface defining a cylindrical wall, the cylindrical wall defining a cylindrical opening, a first retention opening extending through the cylindrical wall and a second retention opening extending through the cylindrical wall. The first body translates within the cylindrical opening of the second body and the locking member engages with the first retention opening to position the alignment device in a first position and the locking member engages with the second retention opening to position the alignment device in a second position.

15 Claims, 2 Drawing Sheets

(56) References Cited

U.S. PATENT DOCUMENTS

| | | | |
|---|---|---|---|
| 9,908,512 B2* | 3/2018 | Renke | B60S 1/52 |
| 10,015,895 B2* | 7/2018 | Sheng | F16B 21/065 |
| 10,118,467 B2* | 11/2018 | Renke | B60J 1/005 |
| 2007/0063539 A1* | 3/2007 | DiMario | B60J 1/10 |
| | | | 296/146.15 |
| 2011/0163216 A1* | 7/2011 | Huang | B66F 1/06 |
| | | | 248/354.7 |
| 2013/0163215 A1* | 6/2013 | Sun | G06F 1/185 |
| | | | 361/759 |
| 2015/0297050 A1* | 10/2015 | Marsh | A47L 9/242 |
| | | | 15/344 |
| 2016/0207503 A1* | 7/2016 | Sugai | B60S 1/52 |

FOREIGN PATENT DOCUMENTS

| | | |
|---|---|---|
| JP | 2001165134 A | 6/2001 |
| JP | 2001280319 A | 10/2001 |
| JP | 4187187 B2 | 11/2008 |
| JP | 2009030796 A | 2/2009 |

\* cited by examiner

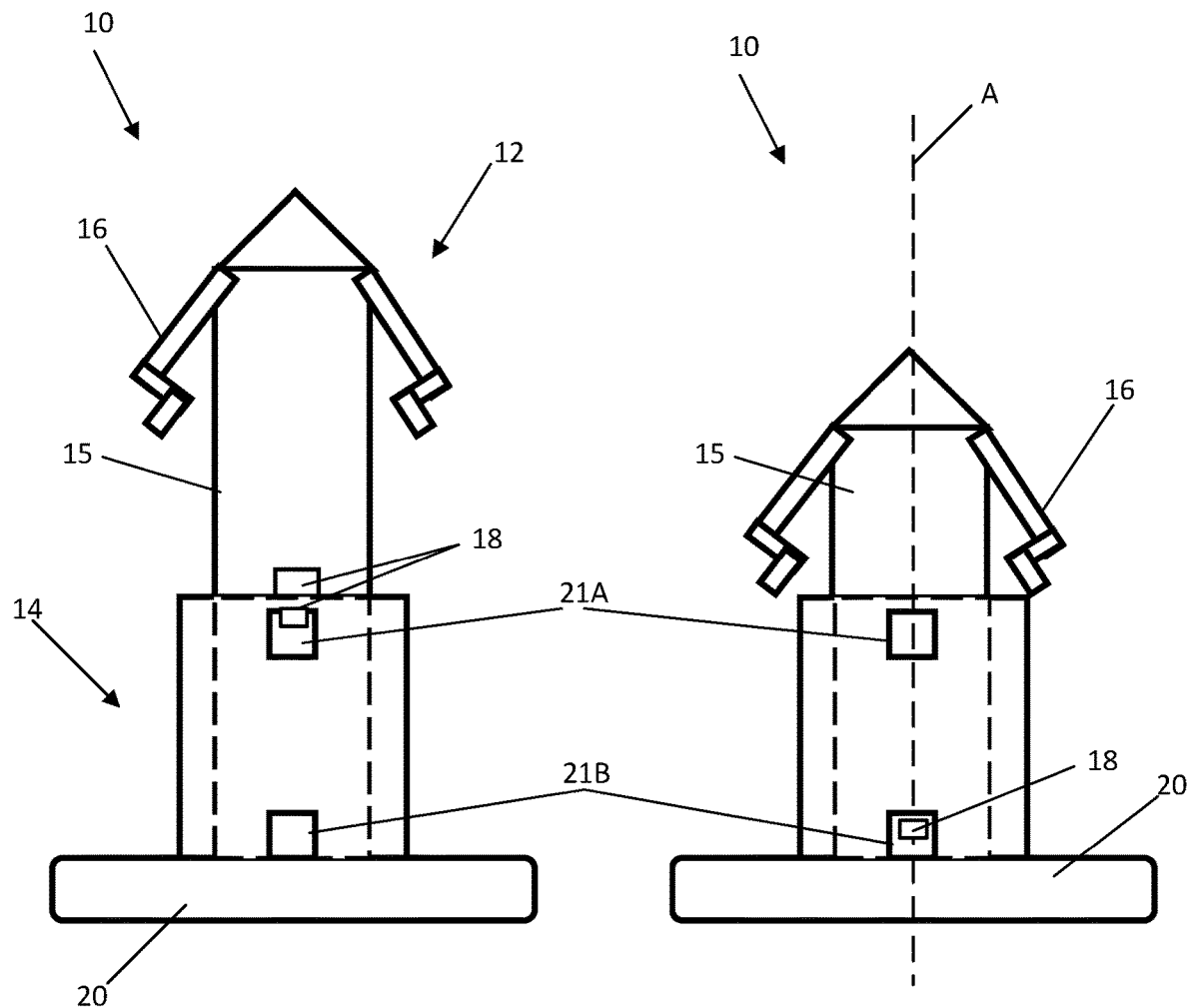

TELESCOPING RETENTION PIN

The present invention relates generally to the field of vehicles and, more specifically, to an alignment and retention pin.

Alignment pins are used to align two components relative to each other during assembly. The use of alignment pins is useful when aligning components where the alignment cannot be verified visually. However, stationary alignment pins may also be difficult to align visually with the mating hole, resulting in component damage or additional manufacturing time and complexity.

SUMMARY

Embodiments according to the present disclosure provide a number of advantages. For example, embodiments according to the present disclosure enable alignment of two components during assembly using a telescoping alignment or retention pin that has an extended position and a collapsed position. In the extended position, the alignment pin is more visible to the installer. In the collapsed position, the alignment pin occupies a minimum package space.

In one aspect, an alignment device includes a first member and a second member. The first member includes a first body having a first end and a second end opposite the first end, at least one retention member flexibly coupled to the first body, and a locking member coupled to the first body. The second member includes a second body having a first end and a second end opposite the first end, the second body having an outer surface and an inner surface defining a cylindrical wall, the cylindrical wall defining a cylindrical opening, a first retention opening extending through the cylindrical wall and a second retention opening extending through the cylindrical wall, the second retention opening positioned closer to the second end of the second body than the first retention opening. In some aspects, the first body translates within the cylindrical opening of the second body and the locking member engages with the first retention opening to position the alignment device in a first position and the locking member engages with the second retention opening to position the alignment device in a second position.

In some aspects, the first position is an extended position.

In some aspects, the second position is a retracted position.

In some aspects, the second member is coupled to a base.

In some aspects, the first body includes two retention members flexibly coupled to the first end of the first body.

In some aspects, the first body includes an alignment surface, the alignment surface extending from an outer surface of the first body.

In some aspects, the second body includes an alignment opening, the alignment opening configured to receive the alignment surface.

In some aspects, the first body includes a first locking member and a second locking member, the first and second locking members positioned on an outer circumference of the first body, the second body includes a first retention opening and a second retention opening, and the first locking member engages with the first retention opening and the second locking member engages with the second retention opening to position the alignment device in an extended position.

In some aspects, the second body includes a third retention opening and a fourth retention opening and the first locking member engages with the third retention opening and the second locking member engages with the fourth retention opening to position the alignment device in a retracted position.

In some aspects, the first member includes a cap coupled to the first end of the first body such that the first body narrows to a point.

In another aspect, an alignment system includes a first member and a second member, the first member slidably received within the second member. The first member includes a first locking member and a second locking member, the second member includes a first retention opening, a second retention opening, a third retention opening, and a fourth retention opening. The first locking member engages with the first retention opening and the second locking member engages with the second retention opening to position the alignment device in a first position and the first locking member engages with the third retention opening and the second locking member engages with the fourth retention opening to position the alignment device in a second position.

In some aspects, the first position is an extended position.

In some aspects, the second position is a retracted position.

In some aspects, the first member includes an alignment surface, the alignment surface extending from an outer surface of the first member.

In some aspects, the second member includes an alignment opening, the alignment opening configured to receive the alignment surface of the first member.

BRIEF DESCRIPTION OF THE DRAWINGS

The present disclosure will be described in conjunction with the following figures, wherein like numerals denote like elements.

FIG. 4 is a schematic side view diagram of the telescoping alignment pin of FIG. 1 in an extended position.

FIG. 5 is a schematic side view of the telescoping alignment pin of FIG. 1 in a retracted position.

Figures 1, 2:
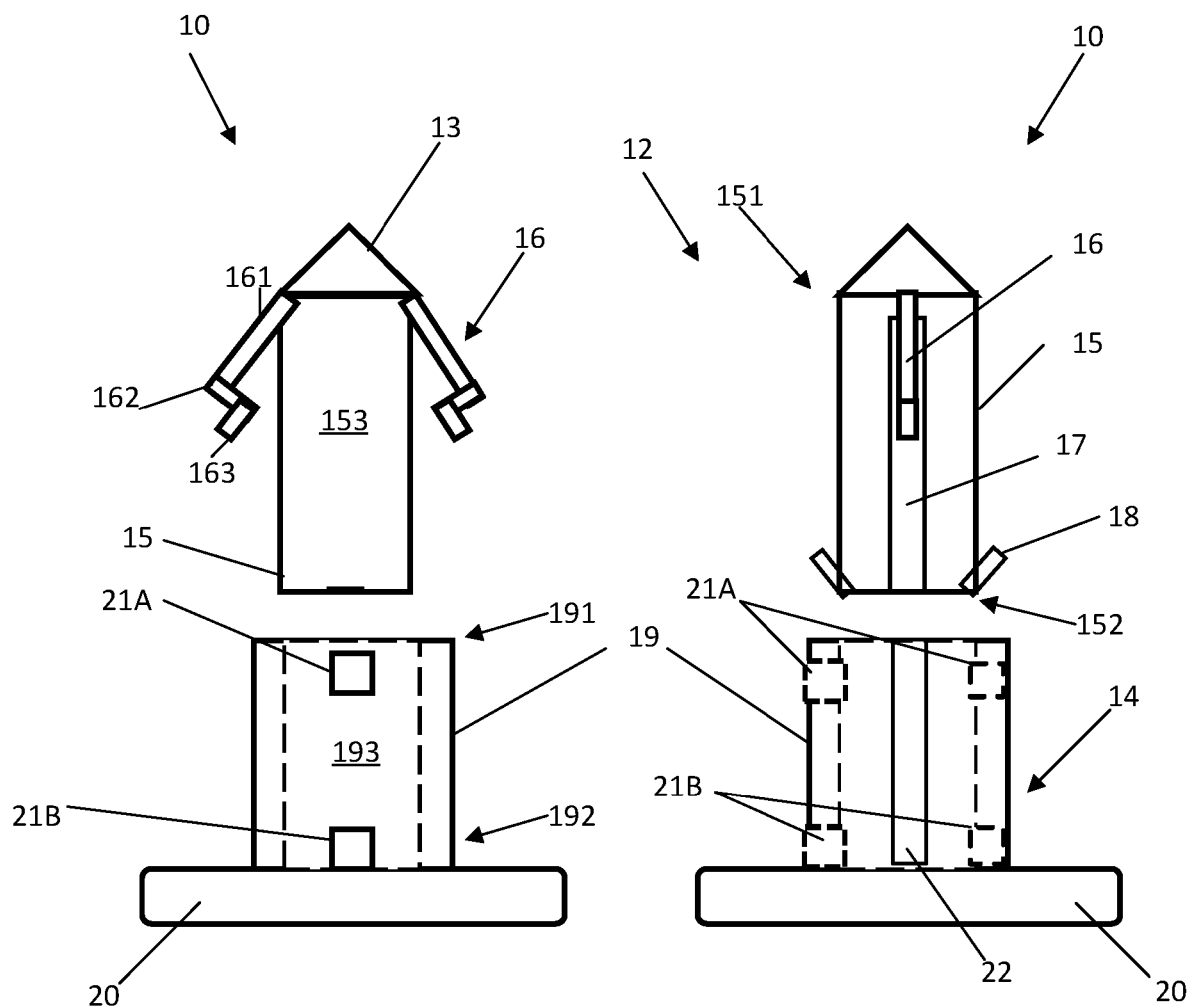
FIG. 1 is a schematic side view diagram of a telescoping alignment pin, according to an embodiment.
FIG. 2 is another schematic side view diagram of the telescoping alignment pin of FIG. 1, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

During some assembly operations, visually aligning a locating/retention pin to a mating hole can be difficult. The alignment pin discussed herein includes a telescoping locating/retention pin that can be extended to help align the pin with the mating hole and then collapse to a retracted position to minimize packaging space requirements. In some embodiments, the alignment pin includes a keyway to provide positive positioning and alignment of the retention members or tabs used to join the components.

With reference to FIGS. 1-5, in one embodiment, an elongate alignment pin 10 includes a first member 12 and a second member 14. In some embodiments, the first member 12 includes a pin body 15 having a first end 151 and a second end 152 opposite the first end. In some embodiments, the pin body 15 includes a cap 13 and one or more retention members 16 flexibly coupled to the pin body 15. In some embodiments, the pin body 15 also includes an alignment surface 17 and one or more locking members 18. In some embodiments, the second member 14 includes a retention body 19, a base 20, one or more positioning openings 21, and an alignment opening 22.

In some embodiments, the pin body 15 is cylindrical and the cap 13 is coupled to the pin body 15 at the first end 151 such that the first member 12 narrows to a point. In some embodiments, the one or more retention members 16 include one or more sections 161, 162, 163 coupled end to end to form an angled tab. In some embodiments, each of the retention members 16 are flexible along their length and flexibly coupled to the pin body 15. In some embodiments, each of the retention members 16 are flexibly coupled proximal to the first end 151 of the pin body 15. The retention members 16 are used, in some embodiments, to join a first component with a second component during an assembly process. The retention members 16 are configured to flex inward or toward the pin body 15 as the alignment pin 10 passes through the mating hole and rebound to an unflexed position once the retention members 16 have passed through the mating hole to secure the components together by applying pressure to the area surrounding the mating hole.

In some embodiments, the pin body 15 also includes an alignment surface 17. The alignment surface 17, in some embodiments, extends from an outer surface 153 of the pin body 15. In some embodiments, the alignment surface 17 extends longitudinally along the outer surface 153 of the pin body 15. In some embodiments, the alignment surface 17 has a rectangular profile. In other embodiments, the alignment surface 17 has a square profile. As shown in FIG. 2, the alignment surface 17 is configured to engage with the alignment opening 22 such as, in some embodiments, a key engaging with a keyway.

The pin body 15 also includes one or more locking members 18. In some embodiments, the locking members 18 are coupled to the pin body 15 proximal to the second end 152. The locking members 18 extend from the outer surface 153 of the pin body 15 at an angle such that the locking members 18 extend away from the second end 152 of the pin body 15. In some embodiments, the locking members 18 are semi-flexible or rigid tabs extending from the second end 152 of the pin body 15. In some embodiments, the locking members 18 are positioned approximately 180 degrees apart such that the locking members 18 are positioned on opposite sides of the second end of the 152. The locking members 18 are configured to engage with the one or more positioning openings 21 in the second member 14. The locking members 18 allow the alignment pin 10 to be temporarily positioned in either an extended or retracted position, as discussed in greater detail herein.

The retention body 19 of the second member 14 extends from the base 20. The retention body 19 is configured to receive the pin body 15 of the first member 12. In some embodiments, the retention body 19 is a longitudinal hollow cylindrical member. The retention body 19 has a first end 191 and a second end 192. The retention body 19 has an outer surface 193 and an inner surface 194 that define the cylindrical wall of the retention body 19. The inner surface 194 defines a cylindrical opening 23 configured to receive the pin body 15 of the first member 12.

Figure 3:
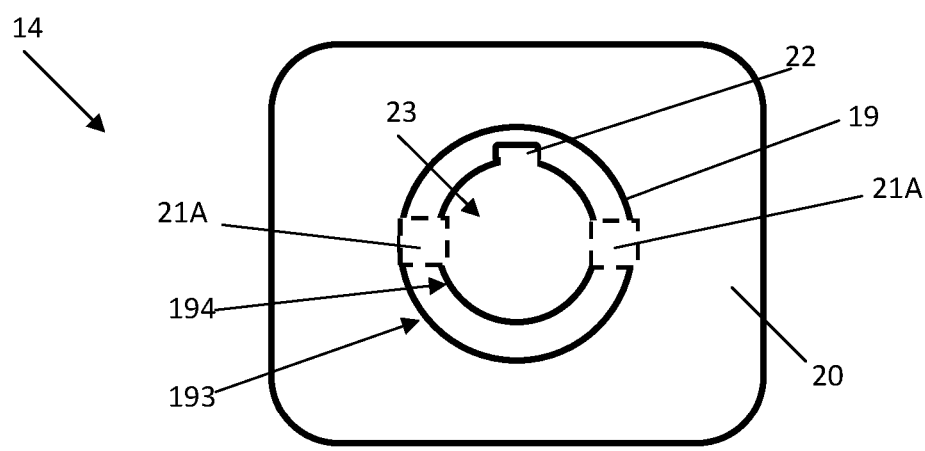
FIG. 3 is a schematic top view diagram of a second member of the telescoping alignment pin of FIG. 1, according to an embodiment.

One or more positioning openings 21 extend at least partially through the wall of the retention body 19. As best illustrated in FIG. 1, a first positioning opening 21A is located proximal to the first end 191 of the retention body 19. With reference to FIG. 3, in some embodiments, a pair of first positioning openings 21A are positioned approximately 180 degrees apart on the retention body 19 such that the first positioning openings 21A are positioned on opposite sides of the retention body 19. In other embodiments, the positioning openings are positioned along the circumference of the retention body 19 to correspond with the position of the locking members 18 on the first member 12.

As shown in FIG. 1, a first set of positioning openings 21A are positioned closer to the first end 191 of the retention body 19. In some embodiments, a second set of positioning openings 21B are positioned closer to the second end 192 of the retention body 19. When the locking members 18 of the first member 12 engage with the first set of positioning openings 21A, the alignment pin 10 is in a first, or extended position. When the locking members 18 engage with the second set of positioning openings 21B, the alignment pin 10 is in a second, or retracted, position.

With reference to FIG. 3, in some embodiments, the inner surface 194 of the retention body 19 defines the alignment opening 22. The alignment opening 22 is configured to receive the alignment surface 17 of the pin body 15. The alignment surface 17 acts as a key that engages the slot of the alignment opening 22 to prevent rotation of the pin body 15 within the retention body 19.

When the alignment pin 10 is in the first position, as shown in FIG. 4, the alignment pin 10 may be used to align a first component with a second component having a mating hole configured to receive the alignment pin 10, such as during a manufacturing assembly process. Once the components are aligned using the alignment pin 10, the components are coupled together at least in part via the retention members 16 and pressure on the first end 151 of the pin body 15 causes the locking members 18 to disengage from the first set of positioning openings 21A such that the pin body 15 translates or slides within the retention body 19. The pin body 15 translates along a longitudinal axis A of the alignment pin 10 until the locking members 18 engage with the second set of positioning openings 21B. As shown in FIG. 5, the pin body 15 retracts within the retention body 19 such that the overall length of the alignment pin 10 is reduced when the alignment pin is in the retracted position.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximate and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. An alignment device, comprising:
 a first member, the first member comprising a first body having a first end and a second end opposite the first end, at least one retention member flexibly coupled to and extending from an outer surface of the first body at the first end, and a locking member coupled to and extending from the outer surface of the first body at the second end; and a second member, the second member comprising a second body having a first end and a second end opposite the first end, the second body having an outer surface and an inner surface defining a cylindrical wall, the cylindrical wall defining a cylindrical opening, a first retention opening extending through the cylindrical wall and a second retention opening extending through the cylindrical wall, the second retention opening positioned closer to the second end of the second body than the first retention opening;

wherein the first body translates within the cylindrical opening of the second body and the locking member engages with the first retention opening to position the alignment device in a first position and the locking member engages with the second retention opening to position the alignment device in a second position.

2. The alignment device of claim 1, wherein the first position is an extended position.

3. The alignment device of claim 1, wherein the second position is a retracted position.

4. The alignment device of claim 1, wherein the second member is coupled to a base.

5. The alignment device of claim 1, wherein the at least one retention member of the first body includes two retention members flexibly coupled to the first end of the first body.

6. The alignment device of claim 1, wherein the first body includes an alignment surface, the alignment surface extending from the outer surface of the first body.

7. The alignment device of claim 6, wherein the second body includes an alignment opening, the alignment opening configured to receive the alignment surface.

8. The alignment device of claim 1, wherein the locking member of the first body includes a first locking member and a second locking member, the first and second locking members are positioned on an outer circumference of the first body, and the first locking member engages with the first retention opening and the second locking member engages with the second retention opening to position the alignment device in the first position, wherein the first position is an extended position.

9. The alignment device of claim 8, wherein the second body includes a third retention opening and a fourth retention opening and the first locking member engages with the third retention opening and the second locking member engages with the fourth retention opening to position the alignment device in the second position, wherein the second position is a retracted position.

10. The alignment device of claim 1, wherein the first member includes a cap coupled to the first end of the first body such that the first body narrows to a point.

11. An alignment system comprising:

a first member and a second member, the first member slidably received within the second member;

wherein the first member includes at least one retention member flexibly coupled to and extending from an outer surface of the first member at a first end, a first locking member extending from the outer surface of the first member and a second locking member extending from the outer surface of the first member, the first and second locking members located at a second end of the first member, the second member includes a first retention opening, a second retention opening, a third retention opening, and a fourth retention opening; and wherein the first locking member engages with the first retention opening and the second locking member engages with the second retention opening to position the alignment device in a first position and the first locking member engages with the third retention opening and the second locking member engages with the fourth retention opening to position the alignment device in a second position.

12. The alignment system of claim 11, wherein the first position is an extended position.

13. The alignment system of claim 11, wherein the second position is a retracted position.

14. The alignment system of claim 11, wherein the first member includes an alignment surface, the alignment surface extending from the outer surface of the first member.

15. The alignment system of claim 14, wherein the second member includes an alignment opening, the alignment opening configured to receive the alignment surface of the first member.

* * * * *